(12) United States Patent
Markel et al.

(10) Patent No.: US 8,378,040 B2
(45) Date of Patent: Feb. 19, 2013

(54) METHODS FOR CLEANING THE DISTRIBUTOR PLATE IN A FLUIDIZED BED REACTOR SYSTEM

(75) Inventors: Eric J. Markel, Kingwood, TX (US); Robert O. Hagerty, Wyckoff, NJ (US); Ryan W. Impelman, Houston, TX (US); Richard B. Pannell, Kingwood, TX (US); Cecile F. Saladino, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 67 days.

(21) Appl. No.: 12/999,803

(22) PCT Filed: Jul. 23, 2009

(86) PCT No.: PCT/US2009/051478
§ 371 (c)(1),
(2), (4) Date: Feb. 22, 2011

(87) PCT Pub. No.: WO2010/036446
PCT Pub. Date: Apr. 1, 2010

(65) Prior Publication Data
US 2011/0196112 A1      Aug. 11, 2011

Related U.S. Application Data

(60) Provisional application No. 61/194,071, filed on Sep. 24, 2008.

(51) Int. Cl.
*C08F 2/00* (2006.01)
*C08F 110/02* (2006.01)
*B08B 3/00* (2006.01)

(52) U.S. Cl. ............... 526/67; 526/74; 526/352; 134/26
(58) Field of Classification Search ............... 526/67, 526/74, 352; 134/26
See application file for complete search history.

(56) References Cited

U.S. PATENT DOCUMENTS

| 4,012,574 | A | 3/1977 | Jones et al. |
| 4,978,722 | A | 12/1990 | Goko et al. |
| 5,026,795 | A | 6/1991 | Hogan |
| 5,034,480 | A | 7/1991 | Funk et al. |
| 5,034,481 | A | 7/1991 | Funk et al. |
| 5,126,414 | A * | 6/1992 | Cooke et al. ............... 526/68 |
| 2007/0244271 | A1* | 10/2007 | Muhle et al. ............... 526/60 |
| 2007/0270558 | A1 | 11/2007 | Scherrer et al. |

FOREIGN PATENT DOCUMENTS

| EP | 0453116 A1 | 10/1991 |
| EP | 0811638 A2 | 12/1997 |
| JP | 59022649 | 2/1984 |
| WO | WO 97/46599 | 12/1997 |

* cited by examiner

*Primary Examiner* — William Cheung
(74) *Attorney, Agent, or Firm* — Kristina Leavitt; Jennifer A. Schmidt

(57) ABSTRACT

A method for cleaning a distributor plate in a fluidized bed polymerization reactor system according to one embodiment includes, in a first mode, operating with about a normal, baseline value of superficial gas velocity in a fluidized bed polymerization reactor system having a reactor vessel, a recycle line, and a distributor plate in the reactor vessel near an inlet of the reactor vessel. In a second mode, the superficial gas velocity is increased above the baseline value of the first mode to a level sufficient to raise the temperature of the cycle gas at the inlet above an average temperature of the cycle gas at the inlet in the first mode, and to a level sufficient to dislodge foulant from holes in the distributor plate.

24 Claims, 6 Drawing Sheets

METHODS FOR CLEANING THE DISTRIBUTOR PLATE IN A FLUIDIZED BED REACTOR SYSTEM

CROSS REFERENCE TO RELATED APPLICATIONS

This application is a National Stage application under 36 U.S.C §371 of International Application No. PCT/US2009/051478, filed Jul. 23, 2009, that claims the benefit of U.S. Provisional Application Ser. No. 61/194,071, filed Sep. 24, 2008, the disclosure of which is incorporated by reference in its entirety.

FIELD OF THE INVENTION

The invention relates to methods directed to cleaning distributor plates in polymerization reactors, more particularly, fluidized bed polymerization reactor systems.

BACKGROUND

In a gas phase process for production of polyolefins such as polyethylene, a gaseous alkene monomer (e.g., ethylene, propylene, etc.), hydrogen, co-monomer and other raw materials are converted to solid polyolefin product. Generally, gas phase reactors include a fluidized bed reactor, a compressor, and a cooler. The reaction is maintained in a two-phase fluidized bed of granular polyethylene and gaseous reactants by a fluidizing gas, which is passed through a distributor plate near the bottom of the reactor vessel. The reactor vessel is normally constructed of carbon steel and rated for operation at pressures up to about 30 bars (or about 3.0 MPa). Catalyst is injected into the fluidized bed. Heat of reaction is transferred to the circulating gas stream. This gas stream is compressed and cooled in an external recycle line and then is reintroduced into the bottom of the reactor where it passes through a distributor plate. Make-up feed streams are added to maintain the desired reactant concentrations.

Operation of most reactor systems is critically dependent upon good mixing in the fluidized bed for uniform reactor conditions, heat removal, and effective catalyst performance. Good mixing is required to ensure that the catalyst is well distributed within the bed so that the reaction rate and resulting heat generation is relatively uniform, thereby minimizing the possibility of localized temperature excursions (or "hot spots") within the bed.

The process must be controllable, and capable of a high production rate. In general, the higher the operating temperature, the greater the capability to achieve high production rate. However, as the operating temperature approaches the melting point of the polyolefin product, the particles of polyolefin become tacky. This can cause the fluidized bed (as a whole) to become cohesive, or sticky. If the temperature exceeds certain limiting temperatures (dependant on the melting point of the polymer involved) the degree of stickiness in the fluidized bed may become excessive, causing poor fluidization and mixing. In some cases, the sticky polymer and resulting lack of mixing can lead to localized temperature excursions of sufficient magnitude to cause the formation of particle agglomerates (or chunks) of fused polymer in the reactor. In other cases, the sticky polymer and poor mixing can promote the formation of polymer sheets on the interior walls of the reactor.

Poor mixing of the fluidized bed (and the consequent potential for chunk or sheet formation) may also be caused by distributor plate fouling. Distributor plate fouling is one of the leading causes of downtime with commercial fluidized bed polymerization reactor systems. Fouling is generally caused by deposition of polymer resin in the numerous small holes in the distributor plate, resulting in reduced fluid flow therethrough or complete blockage thereof. As mentioned above, good mixing of the fluidized bed is needed for uniform temperature control. As the holes in the distributor plate become partially or fully blocked, the ability of the cycle gas entering the fluidized bed to carry heat away from the reacting materials is reduced. Moreover, "hot spots" can develop in areas of low fluid velocity in the fluidized bed (particularly those areas immediately above the partially or fully blocked holes). The net result is the formation of fused chunks of polymer within the fluidized bed, and/or the formation of sheets along the vessel wall and along other parts of the reactor system. These chunks or sheets will eventually fall onto the reactor distributor plate, further interrupting fluidization, circulation of gas, and withdrawal of the product from the reactor. The result is a forced reactor shutdown to clean the system. The formation of chunks or sheets can therefore be a significant "discontinuity event", impacting operations of commercial reactor systems. To minimize the possibility of chunk or sheet formation, it is important to prevent or minimize distributor plate fouling.

More recently, a particularly problematic form of plate fouling (termed hyperfouling) has been observed, which can occur during reactor startup. While the precise cause is not completely understood, high levels of entrainment static (measured in the cycle gas system) are observed upon initiation of catalyst feed to the reactor. This static is attributed to entrainment of catalyst particles from the fluidized bed and consequent triboelectric charging of the catalyst particles by frictional contact with the walls of the recycle system. The charged catalyst particles can be driven to the reactor walls by forces of static attraction, where they can accumulate (especially under the plate and/or top head of the reactor) and fuse to form foulant. This mechanism is supported by the observation of temperature spikes (above net reactor temperature) in the bottom bell of the reactor (below the distributor plate).

Conventional wisdom is that low cycle stream velocities (and correspondingly low superficial gas velocities in the fluidized bed) reduce distributor plate fouling by minimizing entrainment of solids in the cycle stream, thereby minimizing contact of such solids with the distributor plate.

Current methods for removing distributor plate fouling require shutting down the reactor and physically removing the foulant from the holes, such as with a drill. Not only are such shutdowns costly in terms of lost production, but may also pose a danger to the operator entering and working in the reactor system.

Accordingly, it would be desirable to reduce and/or remove distributor plate fouling without requiring system shutdown.

SUMMARY

A method for cleaning a distributor plate in a fluidized bed polymerization reactor system according to one embodiment includes, in a first mode, operating with about a normal, baseline value of superficial gas velocity in a fluidized bed polymerization reactor system having a reactor vessel, a recycle line, and a distributor plate in the reactor vessel near an inlet of the reactor vessel. In a second mode, the superficial gas velocity is increased above the baseline value of the first mode to a level sufficient to raise the temperature of the cycle gas at the inlet above an average temperature of the cycle gas at the inlet in the first mode, and to a level sufficient to dislodge foulant from holes in the distributor plate.

A method for cleaning a distributor plate in a fluidized bed polymerization reactor system according to another embodiment includes monitoring an amount of fouling of a distributor plate in a fluidized bed polymerization reactor system having a reactor vessel, a recycle line, and the distributor plate, the distributor plate being positioned in the reactor vessel near an inlet of the reactor vessel; determining whether to reduce the amount of fouling of the distributor plate; and if the determination indicates a desire or need to reduce the amount of fouling of the distributor plate, increasing a velocity of a cycle gas passing through the recycle line to a level sufficient to dislodge, and preferably clear, foulant from holes in the distributor plate.

A method for producing a polymer in a fluidized bed polymerization reactor system according to yet another embodiment includes starting up a fluidized bed polymerization reactor system having a reactor vessel, a recycle line, and the distributor plate, the distributor plate being positioned in the reactor vessel near an inlet of the reactor vessel; and after achieving a condensed mode of operation, increasing a velocity of a cycle gas traveling through the recycle line to a level sufficient to dislodge, and preferably clear, foulant from holes in the distributor plate.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

It must also be noted that, as used in the specification and the appended claims, the singular forms "a," "an" and "the" include plural referents unless otherwise specified.

The inventors have surprisingly discovered a method to clean the distributor plate of a fluidized bed polymerization reactor, such as a commercial UNIPOL™ Reactor, while it is operating, eliminating the need to shut down the reactor system for distributor plate cleaning. In one approach, the procedure uses high cycle gas velocities to dislodge, and preferably clear, foulant from some of the distributor plate holes.

This discovery is directly contrary to conventional wisdom, which urges use of lower cycle gas velocities to prevent entrainment of product and catalyst in the cycle gas in an effort to minimize fouling of the distributor plate and heat exchanger (also referred to herein as a "cooler").

Figure 1:
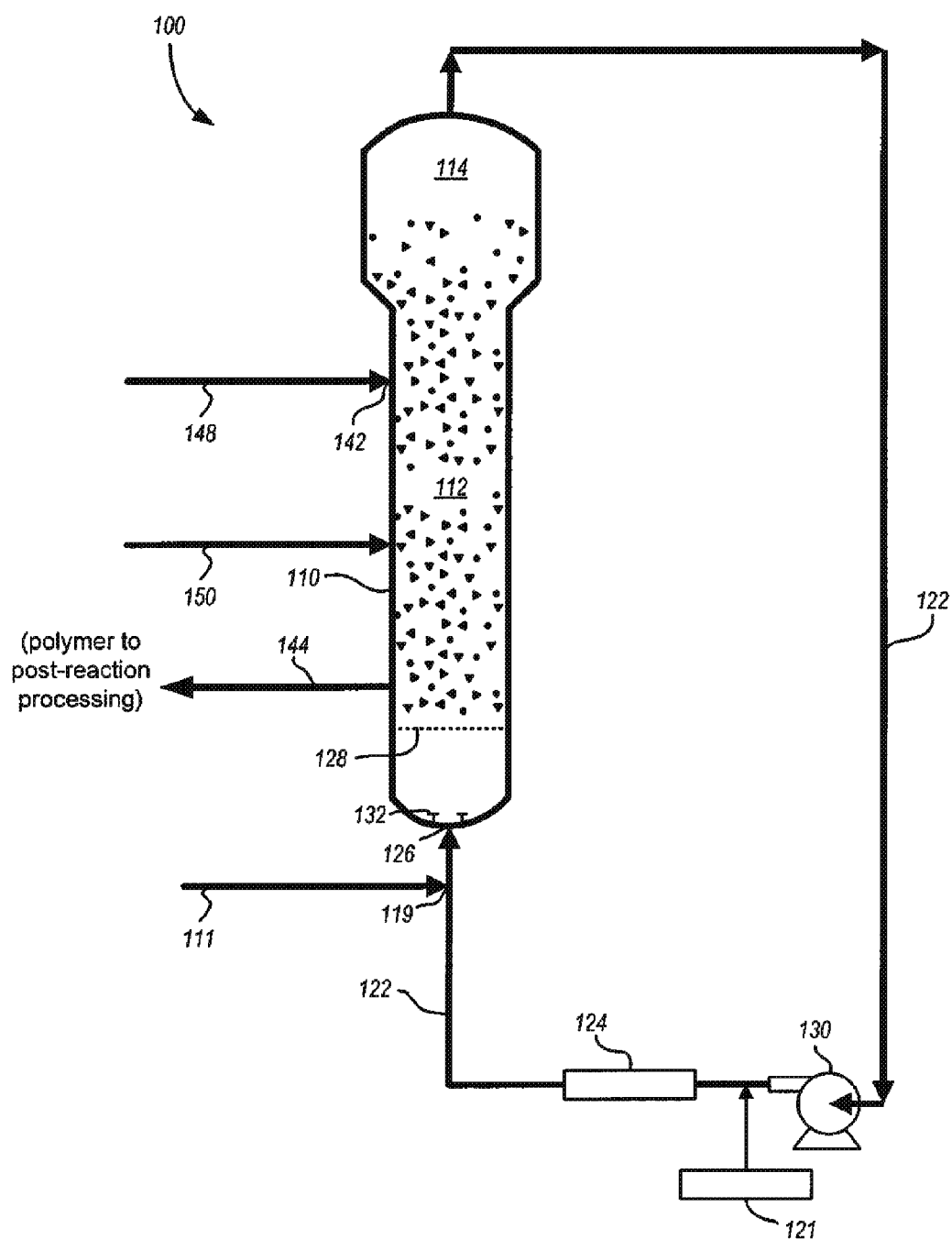
FIG. 1 is a schematic representation of the general methods, systems and/or apparatus of certain embodiments of the invention illustrating implementation in a gas phase polymerization reactor system.

A general method according to one embodiment of the invention can be described, for example, with reference to FIG. 1, in which a cycle gas travels through a fluidized bed polymerization reactor system 100 having a reactor vessel 110, a recycle line 122, and a distributor plate 128 in the reactor vessel 110 near an inlet 126 of the reactor vessel 110. In a first mode, the cycle gas travels at a first velocity (the baseline value of superficial gas velocity) through the fluidized bed polymerization reactor system 100. In a second mode, the superficial gas velocity is increased above the baseline value of the first mode to a level sufficient to raise the temperature of the cycle gas at the inlet 126 above an average temperature of the cycle gas at the inlet 126 in the first mode, and to a level sufficient to dislodge, and preferably clear, some of the foulant from holes in the distributor plate 126.

Note that in this and other embodiments, increasing the velocity of the cycle gas to a level sufficient to a level sufficient to dislodge, and preferably clear, foulant from holes in the distributor plate does not necessarily mean that foulant is immediately cleared from the holes. Nor does it mean that the cycle gas alone causes removal of the foulant. Rather, as will soon become apparent, several hours or days may pass before an appreciable amount of foulant is removed. Moreover, without wishing to be bound by any theory, it is believed that an interplay of conditions, including the increased velocity, aids in removal of the foulant, as discussed below.

In a further generally preferred approach of a general method, with reference to FIG. 1, an amount of fouling of a distributor plate 128 in a fluidized bed polymerization reactor system 100 is monitored. The bed polymerization reactor system 100 preferably includes a reactor vessel 110, a recycle line 122, and the distributor plate 128, the distributor plate 128 being positioned in the reactor vessel 110 near an inlet 126 of the reactor vessel. A determination is made as to the need to reduce the amount of fouling of the distributor plate 128. If the determination indicates a desire or need to reduce the amount of fouling of the distributor plate 128, a velocity of a cycle gas passing through the recycle line is raised to a level sufficient to dislodge, and preferably clear, foulant from holes in the distributor plate.

In yet another generally preferred approach of a general method, with reference to FIG. 1, a fluidized bed polymerization reactor system 100 is started up. The fluidized bed polymerization reactor system 100 includes a reactor vessel 110, a recycle line 122, and a distributor plate 128 positioned generally as above. After achieving a condensed mode of operation, a velocity of the cycle gas passing through the fluidized bed polymerization reactor system 100 is increased to a level sufficient to dislodge, and preferably clear, foulant from holes in the distributor plate.

For ease of understanding of the reader, as well as to place the various embodiments of the invention in a context, much of the following description shall be presented in terms of a commercial, gas phase polyethylene reactor system. It should be kept in mind that this is done by way of non-limiting example only.

Polymerization Process
Fluidized Bed Polymerization Reactor Systems

In each of the aforementioned generally preferred approaches and/or embodiments, the reactor vessel may form part of a fluidized bed polymerization reactor system. Gas phase polymerization reactions may be carried out in fluidized bed polymerization reactors, and can also be carried out in stirred or paddle-type reactor systems (e.g., stirred bed systems) which include solids in a gaseous environment. The following discussion will feature fluidized bed systems, where the present invention has been found to be preferred and especially advantageous.

A fluidized bed can generally include a bed of particles in which the static friction between the particles is disrupted. In each of the aforementioned generally preferred approaches and/or embodiments, the fluidized bed system can be an open fluidized bed system or a closed fluidized bed system. An open fluidized bed system can comprise one or more fluids and one or more types of fluidized solid particles and having one or more fluidized bed surfaces that are exposed to an open uncontrolled atmosphere. For example, an open fluidized bed system can be an open container such as an open-top tank or an open well of a batch reactor or of a parallel batch reactor (e.g., microtiter chamber). Alternatively, the fluidized bed system can be a closed fluidized bed system. A closed fluidized bed system can comprise one or more fluids and one or more types of fluidized particles that are generally bounded by a barrier so that the fluids and particles are constrained. For example, a closed fluidized bed system may include a pipeline (e.g., for particle transport); a recirculating fluidized bed system, such as the fluidized bed polymerization reactor system of FIG. 1; any of which may be associated with various residential, commercial and/or industrial applications.

A closed fluidized bed system can be in fluid communication with an open fluidized bed system. The fluid communication between a closed fluidized bed system and an open fluidized bed system can be isolatable, for example, using one or more valves. Such isolation valves can be configured for unidirectional fluid flow, such as for example, a pressure relief valve or a check valve. In general, the fluidized bed system (whether open or closed) can be defined by manufactured (e.g., man-made) boundaries comprising one or more barriers. The one or more barriers defining manufactured boundaries can generally be made from natural or non-natural materials. Also, in general, the fluidized bed system (whether open or closed) can be a flow system such as a continuous flow system or a semi-continuous flow (e.g., intermittent-flow) system, a batch system, or a semi-batch system (sometimes also referred to as a semi-continuous system). In many instances, fluidized bed systems that are flow systems are closed fluidized bed systems.

The fluidized bed in preferred embodiments is generally formed by flow of a gaseous fluid in a direction opposite gravity. The frictional drag of the gas on the solid particles overcomes the force of gravity and suspends the particles in a fluidized state referred to as a fluidized bed. To maintain a viable fluidized bed, the superficial gas velocity through the bed must exceed the minimum flow required for fluidization. Increasing the flow of the fluidizing gas increases the amount of movement of the particles in the bed, and can result in a beneficial or detrimental tumultuous mixing of the particles. Decreasing the flow results in less drag on the particles, ultimately leading to collapse of the bed. Fluidized beds formed by gases flowing in directions other than vertically include particles flowing horizontally through a pipe, particles flowing downwardly e.g., through a downcomer, etc.

In very general terms, a conventional fluidized bed polymerization process for producing resins and other types of polymers is conducted by passing a gaseous stream containing one or more monomers continuously through a fluidized bed reactor under reactive conditions and in the presence of catalyst at a velocity sufficient to maintain the bed of solid particles in a suspended condition. A continuous cycle is employed where the cycling gas stream, otherwise known as a cycle stream, recycle stream or fluidizing medium, is heated in the reactor by the heat of polymerization. The hot gaseous stream, also containing unreacted gaseous monomer, is continuously withdrawn from the reactor, compressed, cooled and recycled into the reactor. Product is withdrawn from the reactor and make-up monomer is added to the system, e.g., into the cycle stream or reactor, to replace the polymerized monomer. See for example U.S. Pat. Nos. 4,543,399, 4,588,790, 5,028,670, 5,317,036, 5,352,749, 5,405,922, 5,436,304, 5,453,471, 5,462,999, 5,616,661, 5,668,228, and 6,689,847. A basic, conventional fluidized bed system is illustrated in FIG. 1. The reactor vessel 110 (also referred to herein a "reactor") comprises a reaction zone 112 and a velocity reduction zone 114. While a reactor configuration comprising a generally cylindrical region beneath an expanded section is shown in FIG. 1, alternative configurations such as a reactor configuration comprising an entirely or partially tapered reactor may also be utilized. In such configurations, the fluidized bed can be located within a tapered reaction zone but below a region of greater cross-sectional area which serves as the velocity reduction zone of the more conventional reactor configuration shown in FIG. 1.

The reaction zone 112 includes a bed of growing polymer particles, formed polymer particles and a minor amount of catalyst all fluidized by the continuous flow of polymerizable and modifying gaseous components, including inerts, in the form of make-up feed and recycle fluid through the reaction zone. To maintain a viable fluidized bed, the superficial gas velocity through the bed must exceed the minimum flow required for fluidization, which is typically from about 0.2 to about 0.5 ft/sec. for polyolefins (at normal operating temperatures, pressures and gas densities). Conventionally, the superficial gas velocity does not exceed 5.0 ft/sec, and typically does not exceed about 2.9 ft/sec. Typical baseline values of superficial gas velocity in the first mode are therefore in the range of about 0.7 to 2.9 ft/sec, though could be higher.

The terms "cycle gas velocity" and "superficial gas velocity" are used in the specification to describe the flow speed of reactor gas through the reactor cycle (or "recycle") gas line 122 and the fluidized bed section of reactor vessel 110 respectively. These two velocities are closely related. In general, the velocity of the cycle gas is much higher than the superficial gas velocity due to the reduced area of the cycle gas line.

Considering the limiting case of zero reaction rate in the system the velocities are simply related by the area ratio, $$V_{RC} = \frac{A_B}{A_{RC}} \cdot V_S \qquad \text{Equation 1}$$

where $V_{RC}$ is the cycle gas velocity, $V_S$ is the superficial gas velocity, $A_B$ is the cross-sectional area of the fluidized bed, and $A_{RC}$ is the cross-sectional area of the cycle gas line. In the case of non-zero reaction rate, the relationship between the two velocities is more complicated because of a number of factors, including the uptake of gas in the fluidized bed due to reaction, the change of temperature that occurs across the compressor, the addition of make-up gas to the reactor recycle gas line, and the formation of liquid downstream of the cooler (in condensed mode operation). However, considering the fact that the conversion of monomer per pass through the fluidized bed is typically only about 2-5 percent, the above equation still provides an approximate estimate of the relationship between the two gas velocities, accurate to within approximately 15 percent.

On start-up, the reactor is generally charged with a bed of particulate polymer particles before gas flow is initiated. Such particles help to prevent the formation of localized "hot spots" when catalyst feed is initiated. They may be the same as the polymer to be formed or different. When different, they are preferably withdrawn with the desired newly formed polymer particles as the first product. Eventually, a fluidized bed of desired polymer particles supplants the start-up bed.

Fluidization is achieved by a high rate of recycle gas flow to and through the bed, typically on the order of about 20-50 times the rate of feed or make-up fluid. This high rate of recycle provides the requisite superficial gas velocity necessary to maintain the fluidized bed. The fluidized bed has the general appearance of bubbling mass of liquid, with the bubbles created by the flow of gas through the bed. (It is the upward flow of these bubbles that provides the mixing in the bed.) The pressure drop through the bed is generally equal to or slightly greater than the weight of the bed divided by the cross-sectional area.

Referring again to FIG. 1, make-up fluids can be fed at point 119 via feed line 111 and recycle line 122. The composition of the cycle stream is typically measured by a gas analyzer 121 and the composition and amount of the make-up stream is then adjusted accordingly to maintain an essentially steady state composition within the reaction zone. The gas analyzer 121 can be positioned to receive gas from a point between the velocity reduction zone 114 and heat exchanger 124, preferably, between compressor 130 and heat exchanger 124.

To ensure complete fluidization, the cycle stream and, where desired, at least part of the make-up stream can be returned through recycle line 122 to the reactor, for example at inlet 126 below the bed. Preferably, there is a gas distributor plate 128 above the point of return to aid in fluidizing the bed uniformly and to support the solid particles prior to start-up or when the system is shut down. The stream passing upwardly through and out of the bed helps remove the heat of reaction generated by the exothermic polymerization reaction.

The portion of the gaseous stream flowing through the fluidized bed which did not react in the bed becomes the cycle stream which leaves the reaction zone 112 and passes into the velocity reduction zone 114 above the bed where a major portion of the entrained particles drop back onto the bed thereby reducing solid particle carryover.

The cycle stream is then compressed in compressor 130 and passed through heat exchanger 124 where the heat of reaction is removed from the cycle stream before it is returned to the bed. Note that the heat exchanger 124 can also be positioned before the compressor 130. An illustrative heat exchanger 124 is a shell and tube heat exchanger, with the recycle gas traveling through the tubes.

The cycle stream exiting the heat exchange zone is then returned to the reactor at its base and thence to the fluidized bed through gas distributor plate 128. A fluid flow deflector 132 is preferably installed at the inlet to the reactor to prevent contained polymer particles from settling out and agglomerating into a solid mass and to maintain entrained or to re-entrain any particles or liquid which may settle out or become disentrained.

In this embodiment, polymer product is discharged from line 144. Although not shown, it is desirable to separate any fluid from the product and to return the fluid to the reactor vessel 110.

In accordance with an embodiment of the present invention, the polymerization catalyst enters the reactor in solid or liquid form at a point 142 through line 148. If one or more co-catalysts are to be added, as is often the case with Ziegler-Natta catalysts, the one or more cocatalysts may be introduced separately into the reaction zone where they will react with the catalyst to form the catalytically active reaction product and/or affect the reaction proceeding in the reactor system. However the catalyst and cocatalyst(s) may be mixed prior to their introduction into the reaction zone.

A continuity additive may be added in situ to the reactor system 100 via an appropriate mechanism such as feed line 148 or another feed line 150.

The reactor shown in FIG. 1 is particularly useful for forming polyolefins such as polyethylene, polypropylene, etc. Process conditions, raw materials, catalysts, etc. for forming various polyolefins and other reaction products are found in the references disclosed herein. Illustrative process conditions for polymerization reactions in general are listed below to provide general guidance.

The reaction vessel, for example, has an inner diameter of at least about 2 feet, and is generally greater than about 10 feet, and can exceed 15 or 17 feet.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C. In one approach, the reactor temperature is less than about 40° C., 30° C., more preferably less than about 20° C., and even more preferably less than about 15° C. below the melting point of the polyolefin being produced. The process can run at even higher temperatures, e.g., less than about 10° C. or 5° C. below the melting point of the polyolefin being produced. Polyethylene, for example, has a melting point in the range of approximately 115° C. to 130° C.

The overall temperature in a gas phase process typically varies from about 30° C. to about 125° C. In one approach, the temperature at the point of highest temperature in the reactor system is less than about 30° C., more preferably less than about 20° C., and even more preferably less than about 15° C. below the melting point of the polyolefin being produced. In a system such as that shown in FIG. 1, the point of highest temperature is typically at the outlet of the compressor 130.

Other gas phase processes contemplated include series or multistage polymerization processes. Also gas phase processes contemplated by the invention include those described in U.S. Pat. Nos. 5,627,242, 5,665,818 and 5,677,375, and European publications EP-A-0 794 200, EP-B1-0 649 992, EP-A-0 802 202, and EP-B-634 421.

In any of the embodiments described herein, the gas phase process may be operated in a condensed mode, described in more detail below.

In an embodiment, the reactor utilized in embodiments of the present invention is capable of producing greater than 500 lbs of polymer per hour (227 Kg/hr) to about 300,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Figure 2:
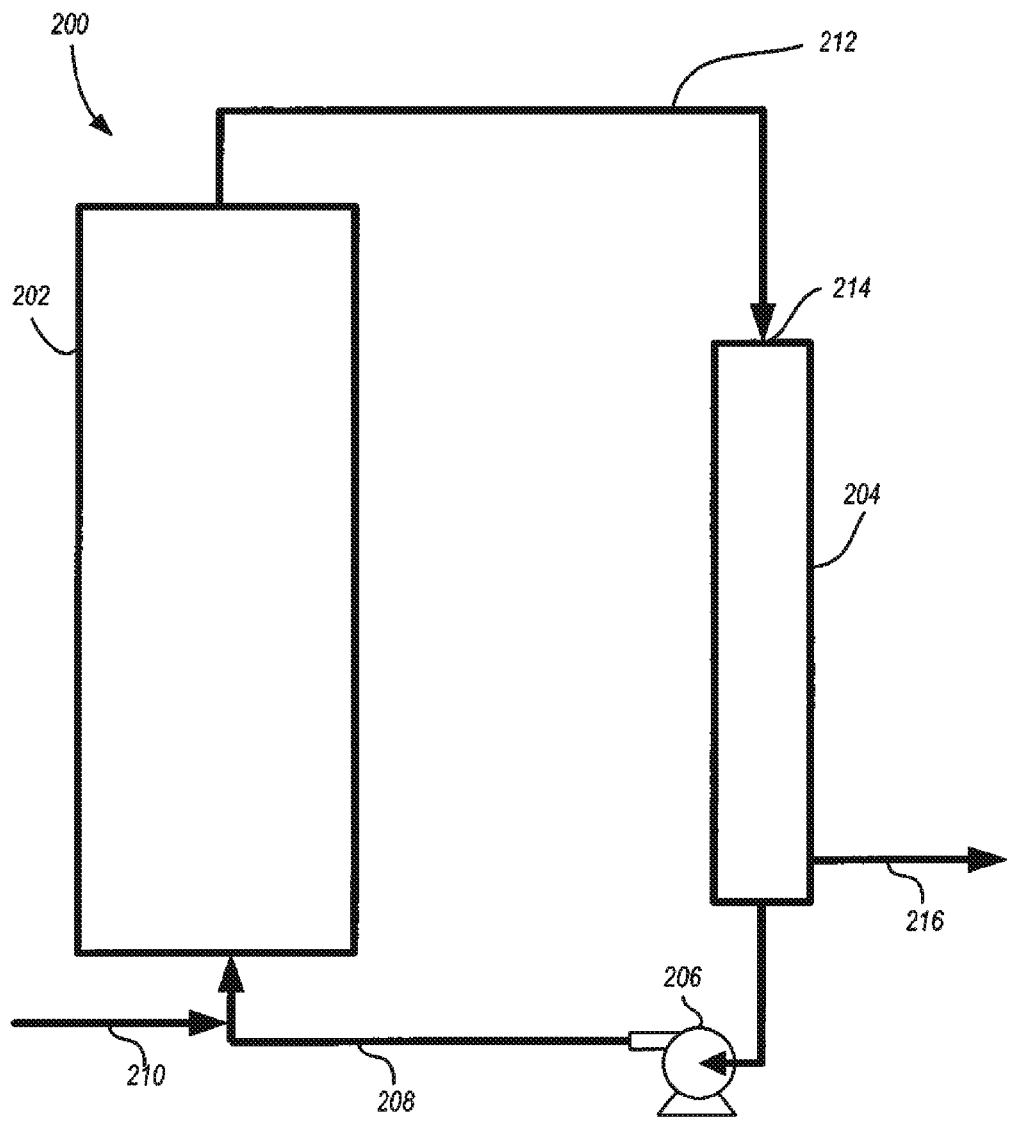
FIG. 2 is a schematic representation of the general methods, systems and/or apparatus of certain embodiments of the invention illustrating implementation in a gas phase polymerization reactor system.

Another illustrative fluidized bed polymerization reactor system 200 is shown in FIG. 2. As shown, the system 200 is a recirculating system including a fast riser 202, a downcomer 204, and a recirculating pump 206. The monomer(s) and catalyst are added to recycle line 208 via feed 210. In this type of system, the polymerization product is formed primarily in the fast riser 202, but continues to form throughout the system. Polymer particles formed in the fast riser 202 pass through line 212 to an upper inlet port 214 of the downcomer 204. The polymer particles gather in the downcomer, where they move downwardly in a dense, slow moving bed. The bed formed in the downcomer can be considered a fluidized bed. Particulate polymer product is discharged from line 216. Although not shown, it is desirable to separate any fluid from the product and to return the fluid to the reactor system 200.

Condensed Mode

In any of the embodiments described herein, the polymerization reaction system may be operated in a condensed or supercondensed mode (collectively "condensed mode"), where the cycle gas stream is cooled to a temperature below the dew point of the cycle gas stream to form a mixture comprising a liquid phase and a gas phase, and which may also contain a minor amount of carried over solid polymer particles. Preferably, an inert condensable fluid is introduced to the process to increase the cooling capacity of the reactor system. These inert condensable fluids are typically referred to as (induced) condensing agents or ICA's. One particularly preferred condensing agent is isopentane, though others can be used. For further details of a condensed mode processes see U.S. Pat. Nos. 5,342,749 and 5,436,304 and U.S. Patent Appl. Pub No. 2005/0267268 A1.

By causing condensation of the condensing agent, more heat can be removed from the reaction system, thereby greatly increasing the polymer production rate.

In one approach, the cycle gas stream is cooled to a temperature below the dew point of the cycle gas stream to form a mixture comprising a liquid phase and a gas phase, and which may also contain a minor amount of carried over solids such as polymer particles, catalyst, etc. In an embodiment, operation in condensation mode is carried out according to the method and apparatus in the U.S. Pat. No. 4,588,790. Embodiments of the present disclosure may also follow the practices found in other prior patents disclosing condensing mode polymerization operations such as in U.S. Pat. Nos. 4,543,399, 5,436,304, 5,462,999, 6,391,985, 5,352,749, 5,405,922, 6,455,644, and European Patent no. 0,803,519 A1.

Operating Conditions

The operating conditions of the reactor and other systems are not narrowly critical to the invention. While general operating conditions have been provided above for fluidized bed polymerization reactor systems, fluidized and nonfluidized bed systems can, in addition to those listed above, have widely varying process conditions, such as temperature, pressure, fluid flow rate, etc.

Distributor Plate Fouling and Remediation

As noted above, the inventors have surprisingly discovered a method to clean the distributor plate of a fluidized bed polymerization reactor, such as a commercial UNIPOL™ Reactor, while it is operating. This finding is very advantageous in that it eliminates the need to shut down the reactor system for distributor plate cleaning. The following description describes how high cycle gas velocities are used to dislodge foulant from the distributor plate holes, and in many instances blowing holes clear of foulant.

This discovery is directly contrary to conventional wisdom, which urges use of lower cycle gas velocities to prevent entrainment of product and catalyst into the cycle gas stream, where such entrainment is believed to be a major cause of distributor plate and heat exchanger fouling.

It has been observed that the holes in the distributor plate tend to grow closed due to foulant accumulation. Generally, the fouling grows from the inner surface of the holes, slowly closing the holes.

The inventors have observed commercial-scale metallocene catalyst-based polyethylene production plant operations in which foulant was removed from the distributor plate by adjusting operating conditions, thereby eliminating the need to shut the reactor down for mechanical cleaning. While the precise mechanism is not understood in detail at this time, and without wishing to be bound by any theory, two factors presently attributed to the cleaning procedure are (i) higher-than-typical inlet temperatures, and (ii) higher-than-usual cycle gas velocities. It is hypothesized that the higher-than-typical inlet temperatures (a consequence of high-velocity operations) allow condensed liquids in the bottom bell of the reactor to swell and loosen polymer deposits in the plate sufficiently for the deposits to be dislodged and blown clear by the higher velocities.

The reason why an increase in superficial gas velocity produces an increase in the temperature of the cycle gas at the reactor inlet is well known to those skilled in the art, and can be explained by considering a heat balance in the system.

The reactor is normally operated with a fixed fluidized bed reaction temperature $T_{RX}$. To maintain this temperature, it is necessary to remove the exothermic heat of reaction that is generated by the production of polymer in the fluidized bed. This is done by cooling the inlet gas to a temperature substantially less than $T_{RX}$. The lower temperature gas flowing into the fluidized bed (through the distributor plate) is heated when it contacts the warmer bed, thereby removing a quantity of heat equal to the increase in sensible heat of the gas.

In addition, if the reactor is operating in condensed mode, there is an additional quantity of heat removed caused by vaporization of the liquid as it enters the fluidized bed. The additional quantity of heat removed equal to the heat of vaporization of the liquid. (The heat removed by the liquid is also called the latent heat of vaporization.) The total quantity of heat removed is given by the sum of the increased sensible heat and heat of vaporization of the gas. Note that, if all other variables are held constant in the system, the rate of heat that is removed through both of these mechanisms is quantitatively proportional to the rate of cycle gas flow.

In normal operation, a steady reaction temperature $T_{RX}$ is maintained by balancing the rate of heat generation with the rate of heat removal from the system. This is done by regulating the temperature of the inlet gas by means of an automated temperature control system. For example, if an increase of $T_{RX}$ over the desired (i.e. set-point) temperature was detected, the automated control system would adjust conditions of the cycle gas cooler to decrease the temperature of the inlet gas. This would increase the cooling of the bed and thereby lower the temperature back to set-point.

An explanation of why an increase in superficial gas velocity produces an increase in temperature of the cycle gas at the reactor inlet can therefore be provided as follows: For a given reactor production rate, the rate of heat generation is constant, and the required rate of heat removal is also constant. If the velocity of the cycle gas were increased, the rate of heat removal would also be increased, and the bed temperature $T_{RX}$ would start to decline (since the rate of heat removal would then be temporarily higher than the rate of heat generation). The temperature control system would sense the decreasing bed temperature and would automatically increase the temperature of the inlet gas as required to bring the bed temperature back to set-point.

In a process utilizing condensed mode operation, condensate tends to pool in the bottom head of the reactor, below the distributor plate. Such liquid pooling has been observed as a violently swirling mass of liquid in the bottom bell, agitated by the flow of cycle gas from the reactor inlet and the inlet flow deflector. The quantity of liquid contained in the pool can reach thousands of pounds of suspended liquid. Previously, it was deemed desirable to avoid such liquid pooling, as it may lead to fluidized bed instability problems. For example, a relatively small temperature increase in the cycle gas could cause partial or complete flashing of the liquid pool, causing a sudden increase in comonomer and condensing agent concentration in the fluid bed, potentially leading to excessive stickiness in the fluidized bed, loss of fluidization and chunk formation.

However, for present purposes, without being bound to theory, it is believed that the defouling is caused by a softening and gradual dissolution of the polymer foulant caused by the higher temperature (the higher temperature that results from the increase in velocity). The polymer foulant is softened in two ways: directly as a result of the higher temperature, and indirectly by a plasticizing effect caused by an increase in hydrocarbons absorbed in the foulant. (It is well known that the solubility of hydrocarbons in polymers increases substantially with temperature.) The softening causes the foulant to slowly dissolve in the presence of the hydrocarbons. This dissolution is believed to be one mechanism causing the foulant to detach from the distributor plate.

An alternate possibility is that the defouling is caused by the effect of the higher impact velocity of liquid droplets against the polymer foulant in the holes. In effect, the higher gas velocities may cause the defouling by an effect similar to that of hydroblasting.

Methods for Cleaning Distributor Plate

Figure 3:
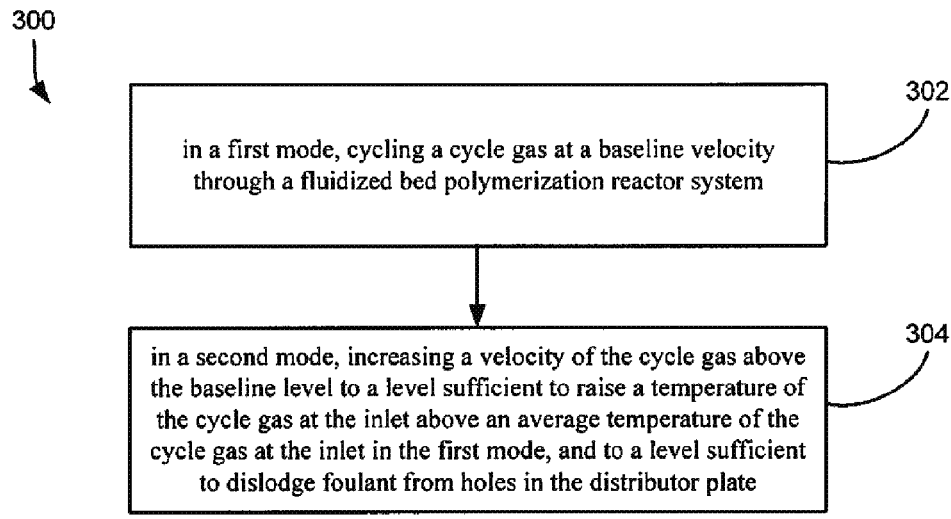
FIG. 3 is a schematic representation of the general methods, systems and/or apparatus of certain embodiments of the invention illustrating implementation in a gas phase polymerization reactor system.

FIG. 3 depicts a method 300 for cleaning a distributor plate in a fluidized bed polymerization reactor according to one embodiment. As shown, the method includes, in a first mode, operating with a normal, baseline value of superficial gas velocity in a fluidized bed polymerization reactor system such as a system described above. (See operation 302.) The velocity can be measured at any point in the system, e.g., in the recycle line, through the heat exchanger, through the reactor vessel or portion thereof, etc. In a second mode, the superficial gas velocity is increased above the baseline value of the first mode to a level sufficient to raise the temperature of the cycle gas at the inlet above an average temperature of the cycle gas at the inlet in the first mode, and to a level sufficient to dislodge, and preferably clear, foulant from holes in the distributor plate. See operation 304.

Again, it must be stressed that, in this and other embodiments, this does not necessarily mean that foulant is immediately dislodged and cleared from the holes. Nor does it mean that the cycle gas alone causes removal of the foulant, though it may. Nor does it mean that all foulant is removed in all cases. Rather, as will soon become apparent, several hours or days may pass before an appreciable amount of foulant is removed. Moreover, without wishing to be bound by any theory, it is believed that an interplay of conditions aids in removal of the foulant, such as the aforementioned higher-than-typical inlet temperatures, higher-than-usual cycle gas velocities, and possible contact of condensed liquid with the foulant. Further, it may be desirable to resume normal operations after a sufficient amount of foulant has been removed.

In general, the velocity of the cycle gas can be controlled by manipulating the cycle compressor. In the first mode, in typical plant operations, the baseline superficial gas velocity is in the range of 2.1 to 2.9 ft/s (0.64 to 0.884 m/s).

The superficial gas velocity of the cycle gas through the reaction zone of the reactor vessel in the second mode is higher than the baseline level of the first mode. In the second mode, the superficial gas velocity may be greater than 2.5 ft/s (>0.762 m/s), more preferably greater than about 3.0 ft/sec, e.g., 3.1 ft/sec (0.94 m/s), 5.0 ft/sec (1.5 m/s), 6.0 ft/sec (1.8 m/s), 7.0 ft/sec (2.1 m/s), etc. In a typical polyethylene production reaction, these cycle gas velocities are at a level sufficient to raise the temperature of the cycle gas at the inlet above an average temperature of the cycle gas at the inlet in the first mode, and to a level sufficient to dislodge, and preferably clear, foulant from holes in the distributor plate.

Again, the values and ranges set forth herein are provided by way of example only, and are not meant to be limiting. Those skilled in the art will appreciate that values and ranges other than those listed above and elsewhere herein may be used, and may depend on the particular processing parameters in use when practicing an embodiment of the present invention.

As discussed in more detail below, cleaning may take several days, such as a week or more. While the exact mechanisms involved are not completely understood, it is believed that the cleaning is accomplished by changing the balance of fouling/defouling that may take place in the reactor system. In this way, fouling operations (when encountered) may be defeated, e.g., by increasing continuity additive level and increasing velocity (relative to continuity additive level/velocity during operations in which fouling occurs).

The first mode may be a startup operation, such as the one described above. As noted above, a particularly problematic form of plate fouling, termed hyperfouling, may occur during a reactor startup. It is believed, without being bound to theory, that hyperfouling is a result of formation and subsequent detachment of small sheets in the bottom bell (below the distributor plate). These small sheets are believed to form as a result of carryover and charging of catalyst in the reactor cycle gas line. The highly charged catalyst may become attached to the walls of the bottom bell and form the small sheets by reaction with the ethylene and other reactant gases present in the cycle gas. Accordingly, the methodology disclosed herein may be used to clean the distributor plate of fouling and hyperfouling.

The first mode may also be a steady state operation, e.g., operating at steady state after startup is complete, and may be in condensed mode. For example, an amount of fouling of the distributor plate may be monitored during operation in the first mode. Upon observance of distributor plate fouling, the fouling exceeding a threshold, etc., the second mode may be initiated.

After some period of time of operation in the second mode, the system may be reverted to the first mode. More preferably, the amount of fouling of the distributor plate is monitored in the second mode, and the system is reverted to the first mode after determining that a predetermined amount of foulant has been removed from the distributor plate. The predetermined amount of fouling can be based on a percent reduction of fouling, a target maximum desired amount of fouling, etc.

Any known method of estimating an amount of distributor plate fouling can be used, such as detecting a change in pressure drop across the distributor plate at a given set of conditions, observance of bed disruptions or anomalies typical of distributor plate fouling, etc. Most commercial operations utilize pressure drop measurements, along with hole geometry, hole count, gas density/viscosity, and gas flow rate values. Percent fouling may then be calculated using the percent of holes which would be completely plugged in order to account for the observed pressure drop. Condensed mode operations may be accounted for by decreasing the nominal gas volumetric flow rates by the mole fraction of gas which is condensed.

Figure 4:
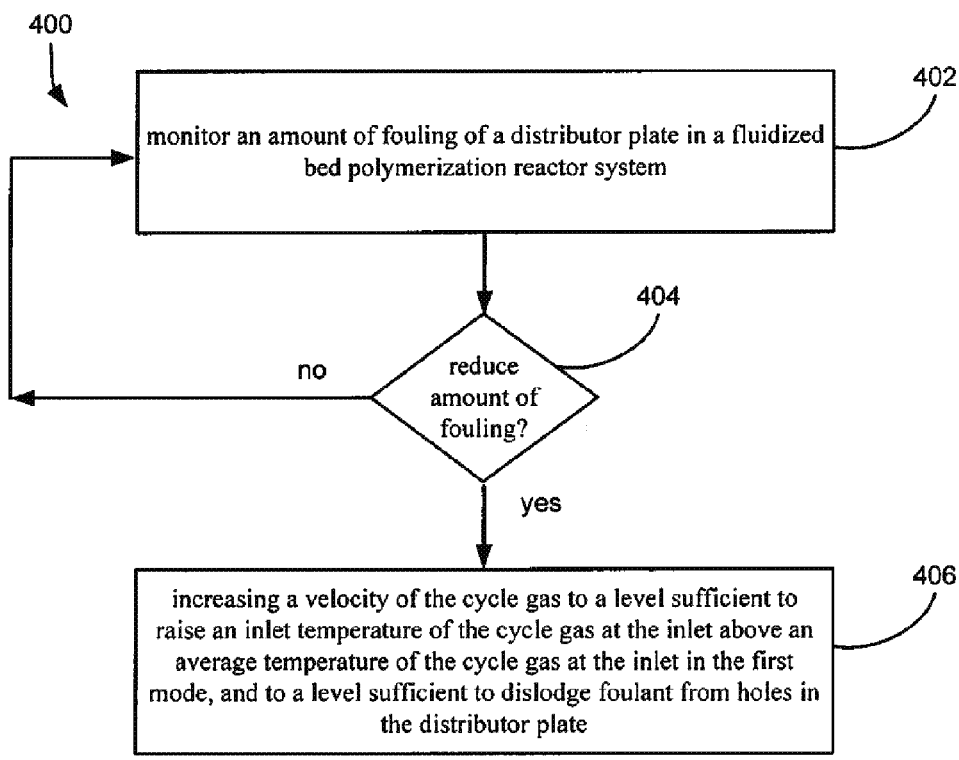
FIG. 4 is a schematic representation of the general methods, systems and/or apparatus of certain embodiments of the invention illustrating implementation in a gas phase polymerization reactor system.

FIG. 4 depicts a method 400 for cleaning a distributor plate in a fluidized bed polymerization reactor according to another embodiment. In operation 402, an amount of fouling of a distributor plate in a fluidized bed polymerization reactor system is monitored. The monitoring may occur during a startup operation, a steady state operation, etc.

In operation 404, a determination is made as to whether to reduce the amount of fouling of the distributor plate. Such determination may be made based on any criteria. In a simple approach, if the amount of fouling is above a predefined threshold, then a cleaning operation may be executed. In more complex approaches, the determination may take multiple factors into consideration, such as an amount of distributor plate fouling, observed disruptions in the bed, etc.

If the determination indicates a desire or need to reduce the amount of fouling of the distributor plate, a velocity of the cycle gas passing through the recycle line is increased to a level sufficient to dislodge foulant from holes in the distributor plate. See operation 406. Note that the increased cycle gas velocity may also increase the temperature of the cycle gas at the inlet of the reactor vessel.

As above, the system may be reverted to its previous state based on some criteria such as passage of time, amount of foulant removed, etc.

Figure 5:
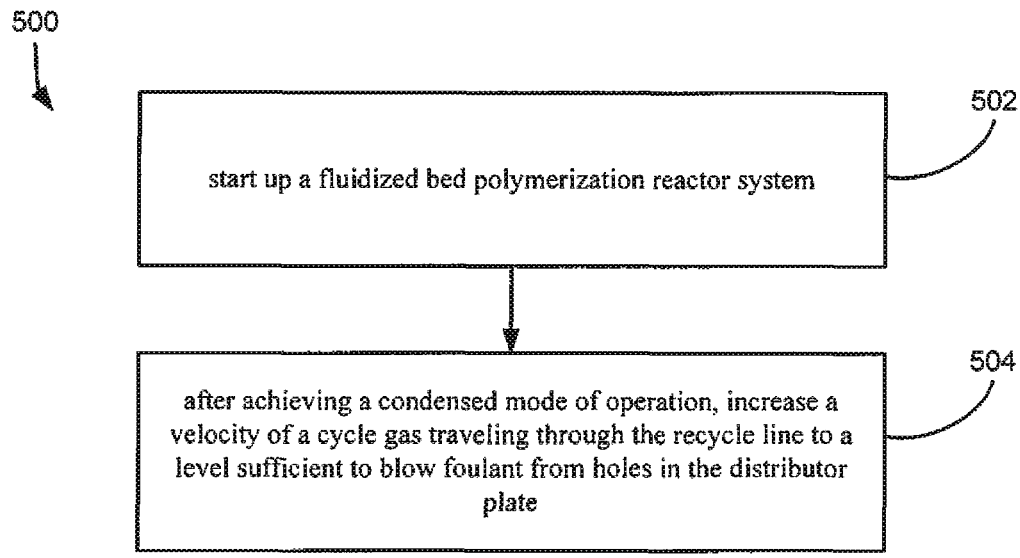
FIG. 5 is a schematic representation of the general methods, systems and/or apparatus of certain embodiments of the invention illustrating implementation in a gas phase polymerization reactor system.

FIG. 5 depicts a method 500 for producing a polymer in a fluidized bed polymerization reactor. In operation 502, a fluidized bed polymerization reactor system, such as one described above, is started up. In operation 504, after achieving a condensed mode of operation, a velocity of a cycle gas traveling through the recycle line is increased to a level sufficient to dislodge foulant from holes in the distributor plate. Achieving condensed mode may allow the aforementioned pooling of liquid in the bottom of the reactor vessel below the distributor plate.

As above, the system may be reverted to its previous state based on some criteria such as passage of time, amount of foulant removed, etc.

Also, it should be noted that about a full production rate can be maintained in both the aforementioned first modes and second modes.

Continuity Additive

In any of the approaches described herein, it may be desirable to counteract the entrainment of solids in the cycle gas stream that would normally occur at the higher velocities used to dislodge, and preferably clear, foulant from the plate. Accordingly, an additive, e.g., a continuity aid, may be added to the reactor system in an amount effective to reduce entrainment of solids from the reactor vessel into the cycle stream at the increased cycle gas velocity used during the cleaning step. The continuity additive, which may or may not be added, facilitates the cleaning process by reducing entrainment of resin and catalyst which could otherwise foul the plate or cooler at high velocities. Moreover, when an entrainment-reducing continuity additive is used, even higher cycle gas velocities can be used, thereby increasing the effectiveness of the methodology presented herein.

Illustrative continuity additives include antistatic agents, which have been the subject of various publications. For example, EP 0 453 116 A1, discloses the introduction of antistatic agents to the reactor for reducing the amount of sheets and agglomerates. U.S. Pat. No. 4,012,574, discloses adding a surface-active compound having a perfluorocarbon group to the reactor to reduce fouling. WO 96/11961, discloses an antistatic agent for reducing fouling and sheeting in a gas, slurry or liquid pool polymerization process as a component of a supported catalyst system. U.S. Pat. Nos. 5,034,480 and 5,034,481, disclose a reaction product of a conventional Ziegler-Natta titanium catalyst with an antistatic agent to produce ultrahigh molecular weight ethylene polymers. For example, WO 97/46599, discloses the use of soluble metallocene catalysts in a gas phase process utilizing soluble metallocene catalysts that are fed into a lean zone in a polymerization reactor to produce stereoregular polymers. WO 97/46599 also discloses that the catalyst feedstream can contain antifoulants or antistatic agents such as ATMER® 163 (commercially available from ICI Specialty Chemicals, Baltimore, Md.).

U.S. Pat. No. 5,026,795, discloses the addition of an antistatic agent with a liquid carrier to the polymerization zone in a gas phase polymerization reactor. Preferably, the antistatic agent is mixed with a diluent and introduced into the reactor by a carrier comprising the comonomer. The preferred antistatic agent disclosed is a mixture, which is marketed under the trademark STADIS® 450 by DuPont and which contains a polysulfone, a polymeric polyamine, a sulfonic acid, and toluene.

EP 0 811 638 A2 discloses using a metallocene catalyst and an activating cocatalyst in a polymerization process in the presence of an antistatic agent, and also discloses the use of ATMER 163. EP 0 811 638 A2 also discloses various methods for introducing the antistatic agent, most preferably the antistatic agent is sprayed into the fluidized bed of the reactor. Another method generally disclosed is the addition of an antistatic agent with the supported or liquid catalyst stream so long as the catalysts are not severely affected or poisoned by the antistatic agent. EP 0 811 638 A2 includes examples in which the supported catalysts were slurried in mineral oil prior to being introduced to the reactor and the antistatic agent was introduced directly to the reactor when using the unsupported catalysts. Static was measured in the fluidized bed itself a few feet above the distributor plate. Preferably, the antistatic agent was added intermittently in response to a change such as a rising level of static electricity.

The continuity additive may be added to the reactor using any known process.

In an illustrative production scenario, the continuity additive is present at about 3%±2% by weight in the catalyst/carrier/additive mixture.

It has been observed that the use of aluminum stearates such as aluminum distearate decreases the level of entrainment during metallocene catalyst-based polyethylene production operations. One particularly preferred continuity additive is CA-200, sold by Univation Technologies having a sales address at 5555 San Felipe, Suite 1950; Houston, Tex., 77056, USA. It is expected that other continuity additive mixtures such as CA-300 will also be effective.

In an illustrative production scenario, the active ingredient in the continuity additive is added at about 5 ppm±5 ppm relative to the production rate of the reactor system during the cleaning period. For example, if the system is generated 100,000 kilograms per hour of polyethylene, about 500 grams of aluminum distearate per hour is added during the cleaning period.

The determination of whether or not to add a continuity additive, and how much to add, may be based on an amount of solids entrained in the cycle gas stream. The amount of solids entrained can be estimated in any conventional way. In one illustrative approach, an acoustic sensor detects the sounds of the solid particles striking the walls of the recycle line. The frequency of the impacts can then be used to estimate an amount of solids entrained. In another illustrative approach, an optical sensor in the recycle line detects solids passing thereby.

One practicing the invention should also keep in mind that some continuity additives may interfere with catalyst productivity. If such a case is encountered, lower levels of continuity additive may be selected.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

In all runs, ethylene is polymerized in a gas phase catalytic reaction process. The reactor vessel is 14.5 ft (4.42 m) in diameter with a vertical dimension (neck height) of 44.5 ft (13.56 m) relative to the top of the distributor plate The catalyst used in all runs is XCAT™ HP-100 catalyst, available from UNIVATION TECHNOLOGIES having a sales office at Houston, Tex., 77056.

Example 1

Comparative Example

Figure 6:
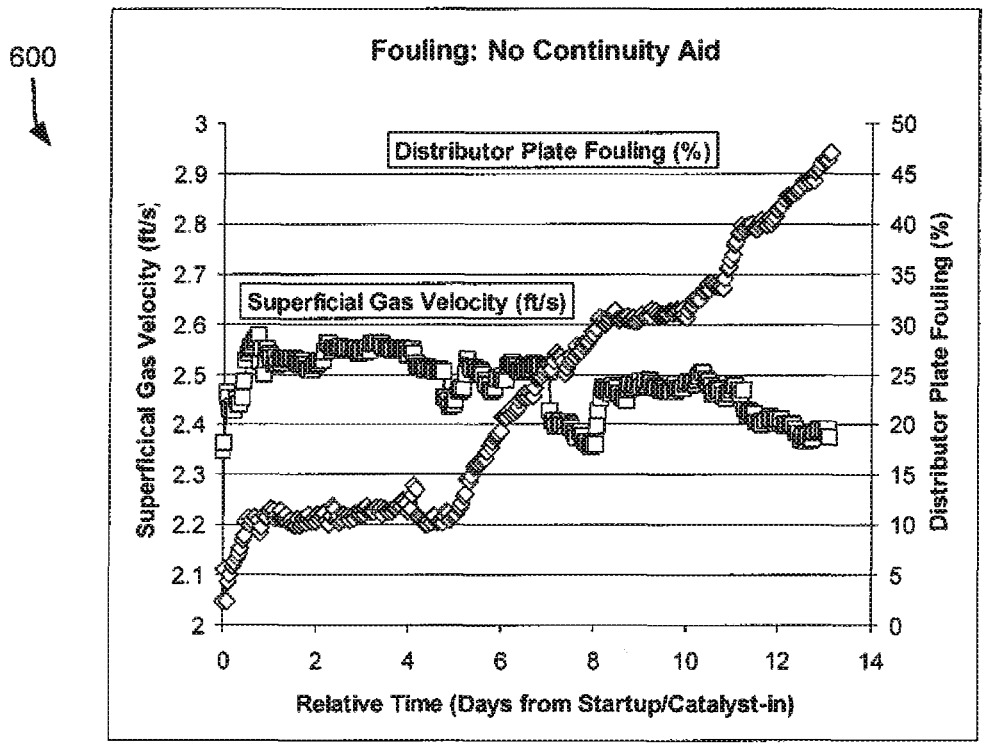
FIG. 6 is a chart illustrating a typical plate fouling profile vs. time after reaching condensed mode at Time=0 days for a gas phase fluidized bed polyethylene polymerization process, with no continuity additive.

The chart 600 shown in FIG. 6 illustrates a typical plate fouling profile vs. time after reaching condensed mode at Time=0 days for a process performed according to the above-described parameters, with no continuity additive.

This comparative example illustrates a typical case where the cycle gas velocity remains about constant. As shown, the fouling of the distributor plate is present at Time=0 and continues to rise for the duration of the data set. Traditionally, it has been desirable to shut down the reactor system and clean the distributor plate upon reaching about 40% fouling. In the instant example, it is seen that the plate fouling reached 40% at about day 11 of operation.

Example 2

Comparative Example

Figure 7:
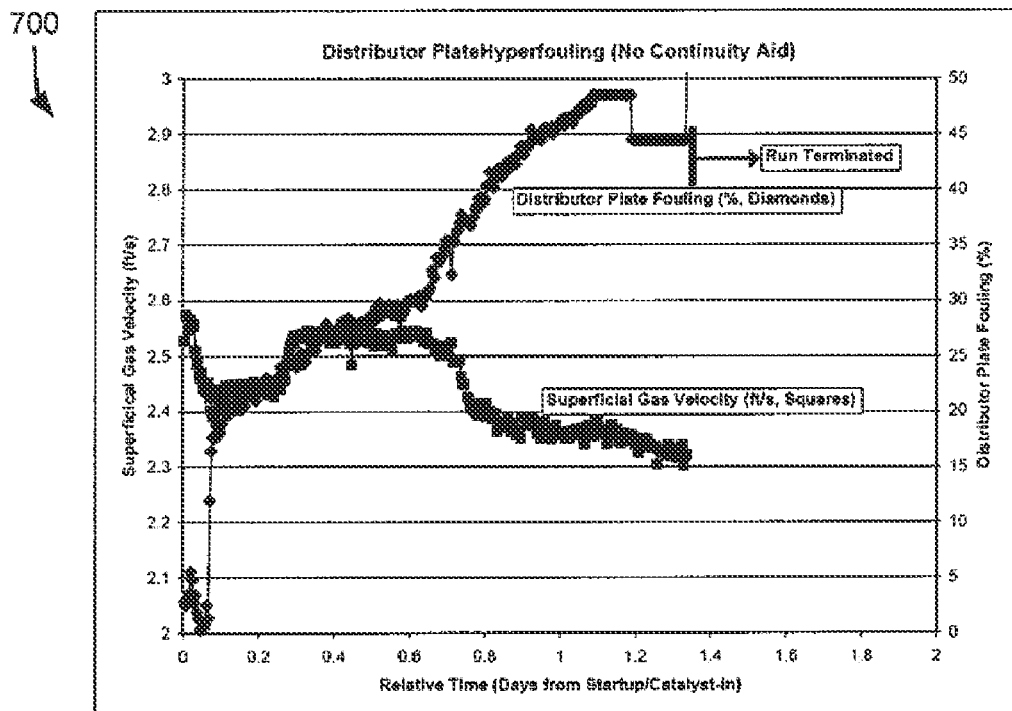
FIG. 7 is a chart illustrating a plate fouling profile vs. time after reaching condensed mode at Time=0 days for a gas phase fluidized bed polyethylene polymerization process, with no continuity additive.

The chart 700 shown in FIG. 7 illustrates a plate fouling profile vs. time after reaching condensed mode at Time=0 days for a process performed according to the above-described parameters, with no continuity additive. In this example, hyperfouling occurs, causing termination of operations in less than two days.

Example 3

Figure 8:
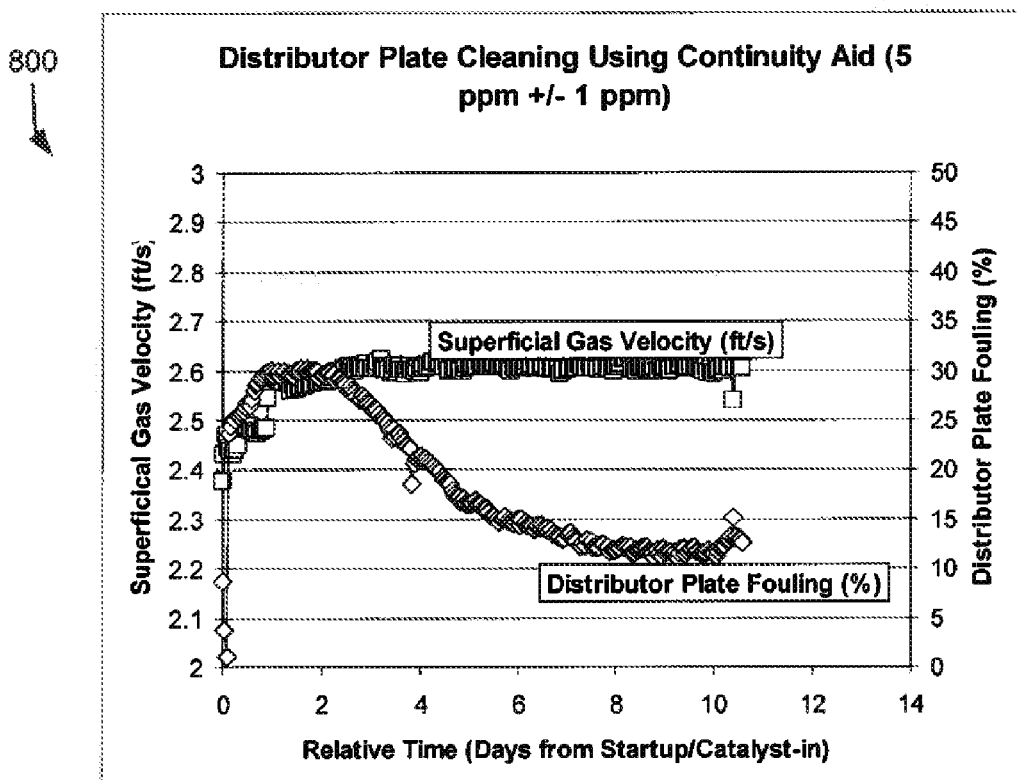
FIG. 8 is a chart illustrating a plate fouling profile vs. time after reaching condensed mode at Time=0 days for a gas phase fluidized bed polyethylene polymerization process, with continuity additive and increased cycle gas velocity.

The chart 800 shown in FIG. 8 illustrates a plate fouling profile vs. time after reaching condensed mode at Time=0 days for a process performed according to the above-described parameters, with CA-200 continuity additive, sold by Univation Technologies having a sales address at 5555 San Felipe, Suite 1950; Houston, Tex., 77056, USA.

As shown, the superficial gas velocity is increased to about 2.6 ft/sec after about a day. Continuity additive is also added during the cleaning process. The fouling decreases to just above 10% after about 8 days.

While not shown, the superficial gas velocity is later lowered to less than about 2.5 ft/sec for steady state operations.

Once a cleaning procedure has been performed after startup, it is expected that distributor plate fouling during steady state operation at lower cycle gas velocities will either not increase or slowly increase. Of course, a cleaning procedure can be implemented as needed to clean the distributor plate during steady state operations.

Example 4

Figure 9:
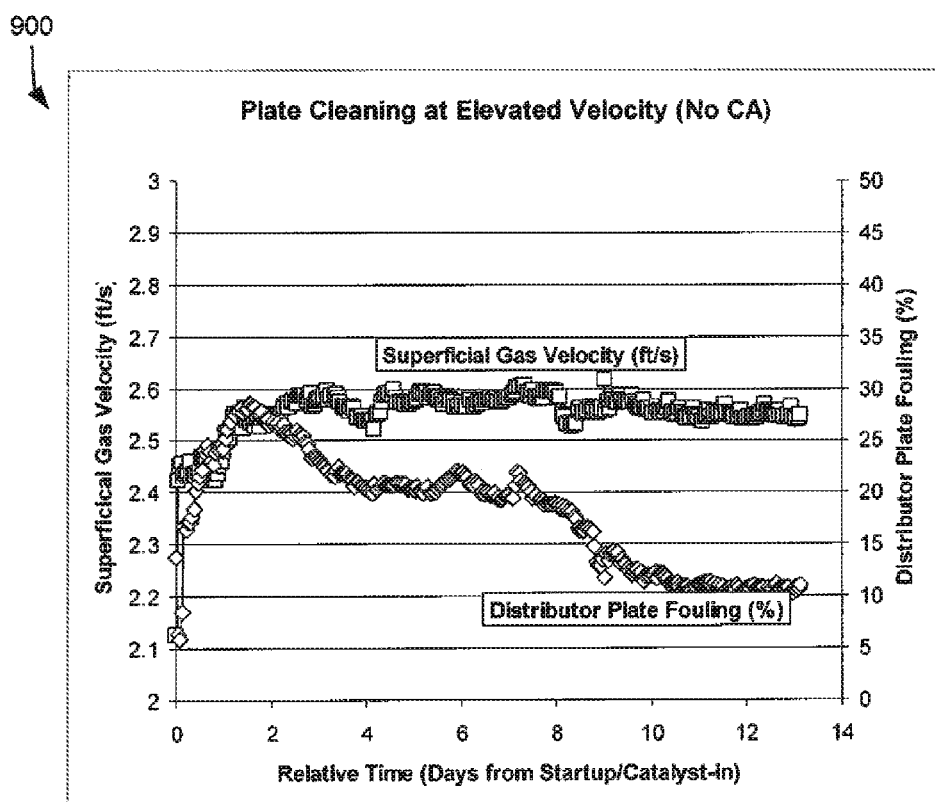
FIG. 9 is a chart illustrating a plate fouling profile vs. time after reaching condensed mode at Time=0 days for a gas phase fluidized bed polyethylene polymerization process, with no continuity additive and increased cycle gas velocity.

The chart 900 shown in FIG. 9 illustrates a plate fouling profile vs. time after reaching condensed mode at Time=0 days for a process performed according to the above-described parameters, with no continuity additive added during the cleaning procedure. The superficial cycle gas velocity is increased above 2.5 ft/sec without addition of continuity additive. Shortly after increasing the cycle gas velocity, foulant is removed from the distributor plate. After about 10 days, fouling decreases to about 10%.

Example 5

A process is performed according to the above-described parameters, with no continuity additive added during the cleaning procedure. The superficial gas velocity is increased above 2.5 ft/sec without addition of continuity additive. Shortly after increasing the superficial gas velocity, distributor plate fouling declines for several days to a low value of about 24%, then slowly increases until about day 10. However, the percent fouling remains steady at about 27-30% after about 10 days.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for cleaning a distributor plate in a fluidized bed polymerization reactor system, the method comprising:
   in a first mode, operating with about a baseline value of superficial gas velocity in a fluidized bed polymerization reactor system having a reactor vessel, a recycle line, and a distributor plate in the reactor vessel near an inlet of the reactor vessel;
   in a second mode, increasing the superficial gas velocity above the baseline value of the first mode to a level sufficient to raise the temperature of the cycle gas at the inlet above an average temperature of the cycle gas at the inlet in the first mode, and to a level sufficient to dislodge foulant from holes in the distributor plate.

2. The method of claim 1, further comprising adding an additive to the reactor system in an amount effective to reduce entrainment of solids from the reactor vessel into the cycle stream at the increased cycle gas velocity.

3. The method according to claim 2, wherein the additive is an aluminum stearate.

4. The method as recited in claim 1, wherein the first mode is a startup operation, a steady state operation, or a condensed mode operation.

5. The method as recited in claim 1, further comprising reverting to the first mode after a period of time.

6. The method as recited in claim 1, further comprising monitoring an amount of fouling of the distributor plate in the first mode.

7. The method as recited in claim 1, further comprising monitoring an amount of fouling of the distributor plate in the second mode.

8. The method as recited in claim 7, further comprising reverting to the first mode after determining that a predetermined amount of foulant has been removed from the distributor plate.

9. The method of claim 1, wherein the velocity of the cycle gas is increased to at least 5 ft/sec (1.5 m/s).

10. The method of claim 1, wherein the velocity of the superficial gas is increased for at least several hours.

11. A method for cleaning a distributor plate in a fluidized bed polymerization reactor system, the method comprising:
    monitoring an amount of fouling of a distributor plate in a fluidized bed polymerization reactor system having a reactor vessel, a recycle line, and the distributor plate, the distributor plate being positioned in the reactor vessel near an inlet of the reactor vessel;
    determining whether to reduce the amount of fouling of the distributor plate; and
    if it is determined to reduce the amount of fouling of the distributor plate, increasing a velocity of a cycle gas passing through the recycle line to a level sufficient to dislodge foulant from holes in the distributor plate.

12. The method of claim 11, further comprising adding an additive to the reactor system in an amount effective to reduce entrainment of solids from the reactor vessel into the cycle stream at the increased cycle gas velocity.

13. The method of claim 12, wherein the additive is an aluminum stearate.

14. The method of claim 11, further comprising reducing the velocity of the cycle gas after a period of time.

15. The method of claim 11, further comprising reducing the velocity of the cycle gas after determining that a predetermined amount of foulant has been removed from the distributor plate.

16. The method of claim 11, further comprising increasing a velocity of the cycle gas passing through the cycle line to a level sufficient to raise the temperature of the cycle gas at the inlet.

17. The method of claim 11, wherein the fluidized bed is running in a condensed mode during the monitoring.

18. The method of claim 11, wherein the velocity of the cycle gas is increased to at least 5 ft/sec (1.5 m/s).

19. A method for producing a polymer in a fluidized bed polymerization reactor system, the method comprising:
    starting up a fluidized bed polymerization reactor system having a reactor vessel, a recycle line, and the distributor plate, the distributor plate being positioned in the reactor vessel near an inlet of the reactor vessel; and
    after achieving a condensed mode of operation, increasing a velocity of a cycle gas traveling through the recycle line to a level sufficient to dislodge foulant from holes in the distributor plate.

20. The method of claim 19, further comprising adding an additive to the reactor system in an amount effective to reduce entrainment of solids from the reactor vessel into the cycle stream at the increased cycle gas velocity.

21. The method of claim 20, wherein the additive is an aluminum stearate.

22. The method of claim 19, further comprising monitoring an amount of fouling of the distributor plate during the starting up.

23. The method of claim 19, further comprising increasing a velocity of the cycle gas to a level sufficient to raise the temperature of the cycle gas at the inlet above an average temperature of the cycle gas at the inlet during the starting up.

24. The method of claim 19, wherein the velocity of the cycle gas is increased to at least 5 ft/sec (1.5 m/s).

* * * * *